(12) United States Patent
Koger et al.

(10) Patent No.: US 11,301,015 B2
(45) Date of Patent: Apr. 12, 2022

(54) MULTIPORT ENERGY SUPPLY FOR A NONVOLATILE MEMORY MODULE

(71) Applicant: AgigA Tech Inc., San Diego, CA (US)

(72) Inventors: Thomas O Koger, San Diego, CA (US); Jeffrey Chang, San Diego, CA (US); Torry J Steed, San Diego, CA (US); Steven Niu, Sichuan (CN)

(73) Assignee: AGIGA TECH INC., San Diego, CA (US)

( * ) Notice: Subject to any disclaimer, the term of this patent is extended or adjusted under 35 U.S.C. 154(b) by 232 days.

(21) Appl. No.: 15/368,986

(22) Filed: Dec. 5, 2016

(65) Prior Publication Data

US 2018/0157301 A1    Jun. 7, 2018

(51) Int. Cl.
*G06F 1/28* (2006.01)
*G06F 13/40* (2006.01)
*G06F 13/42* (2006.01)
*G06F 1/26* (2006.01)

(52) U.S. Cl.
CPC .............. *G06F 1/28* (2013.01); *G06F 1/266* (2013.01); *G06F 13/4068* (2013.01); *G06F 13/4282* (2013.01); *Y02D 10/00* (2018.01)

(58) Field of Classification Search
None
See application file for complete search history.

(56) References Cited

U.S. PATENT DOCUMENTS

| 9,529,543 | B1 * | 12/2016 | Chinnakkonda Vidyapoornachary .. G11C 5/04 |
| 2016/0202749 | A1 * | 7/2016 | Milton ...................... G06F 1/30 713/340 |
| 2017/0249191 | A1 * | 8/2017 | Chang ................... G06F 9/4881 |

\* cited by examiner

*Primary Examiner* — Paul Yen

(57) ABSTRACT

A power module for a computer system includes an internal source of stored energy and a group of interface ports, including a management port and non-management ports. The management port provides a control interface to control the power module. The non-management ports each lack the control interface of the management port, and each provide a signal indicating that the power module has a sufficient amount of the stored energy to power a defined operation by external devices coupled to and drawing power from said non-management ports. The management port will typically provide a similar signal to the coupled management device. The signal may be implemented as a high or low voltage level on a serial interface cable pin.

18 Claims, 7 Drawing Sheets

MULTIPORT ENERGY SUPPLY FOR A NONVOLATILE MEMORY MODULE

BACKGROUND

Non-volatile dual in-line memory module (NVDIMM) subsystems are commonly designed be used in a device managed one-to-one configuration with a power module, meaning that each NVDIMM subsystem has a dedicated power module that a host device incorporating the NVDIMM subsystems manages. One example of such a conventional arrangement is illustrated in FIG. 1.

Referring to FIG. 1, a memory system 100 includes multiple power modules 102, one power module dedicated to each of the NVDIMMs 104 in a one-to-one configuration. Each of the power modules 102 includes a power port 108 that powers one of the NVDIMMs 104.

Another common NVDIMM system utilizes a host-managed central energy source on the motherboard or other component of the host system, with many NVDIMMs attached to the single, common power module. One example of such a conventional arrangement is illustrated in FIG. 2.

Referring to FIG. 2, a memory system 200 comprises NVDIMMs 104 coupled to a common power module 208. The power module 208 includes a host device control port 204 coupled to a host device 202. Each of the NVDIMMs 104 are coupled to a non-management port 206. The host device 202 manages the power module 208 directly via the host device control port 204.

A disadvantage of such systems is that they require management of the NVDIMM system power from a host device that incorporates the NVDIMM as a non-volatile memory resource.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"Control port" in this context refers to a port through which a module may be controlled by external devices. A control port may also be referred to as a management port. Herein, "control" refers to operations executed by the module that is controlled, other than simply reporting status information for the module. In other words, a control port enables an external device to cause a module to perform operations other than merely reporting the module's status. Ports that only enable the reading of the status of a module are referred to herein as "non-management ports".

"Dedicated" in this context refers to used only for the identified function(s) or with the identified component(s).

"Module" in this context refers to logic packaged so as to have discrete interfaces such that logic of the module can be installed into a larger system as a set simply by installing the interfaces of the module into the larger system.

"Optional register access" in this context refers to a register (hardware or virtual) address that is exposed to the host device only by management NVDIMM modules in a host device, and which is not exposed to the host device by non-management NVDIMM devices.

"Power port" in this context refers to an interface on a power module into which a cable may be plugged supplying power from the power module.

"Required register access" in this context refers to a register (hardware or virtual) address that is exposed to the host device by all NVDIMM modules in a host device, regardless of whether the NVDIMMs are configured as management or non-management NVDIMM devices.

An NVDIMM and associated power module are disclosed that enable systems in which many NVDIMMs are self-managed but all coupled to and supplied by a single shared power module. This removes the burden of managing the power module from the host device, and allows one of the connected NVDIMMs to self-manage the power module. One NVDIMM of the group of connected NVDIMMs is made responsible for managing the power module, and to report energy status of the power module back to the host device. Other NVDIMMs supplied from the power module do not manage the power module. The NVDIMM responsible for managing the power module is determined by connection to a specific management port on the power module.

Figure 1:
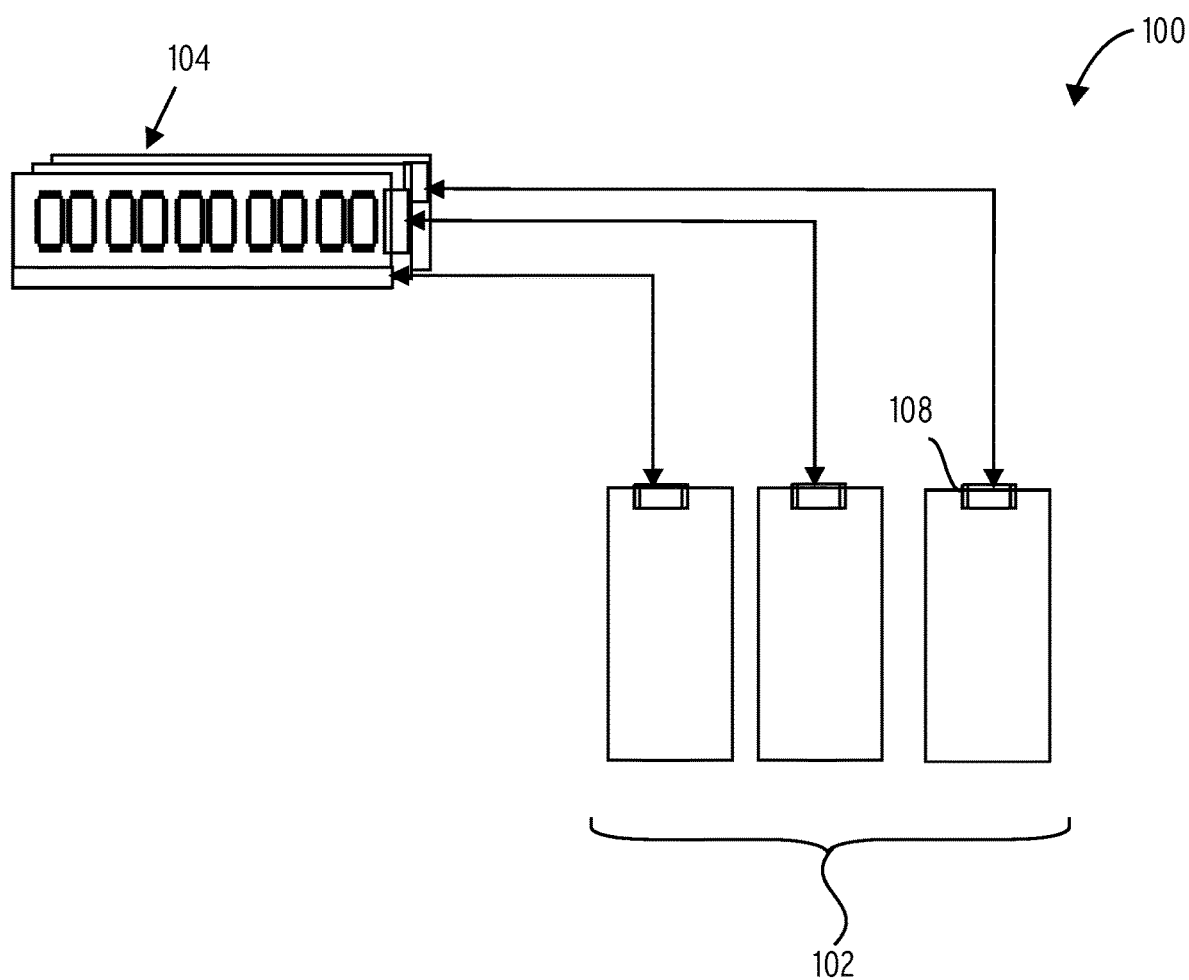
FIG. 1 illustrates a memory system 100 in accordance with one embodiment.
Figure 2:
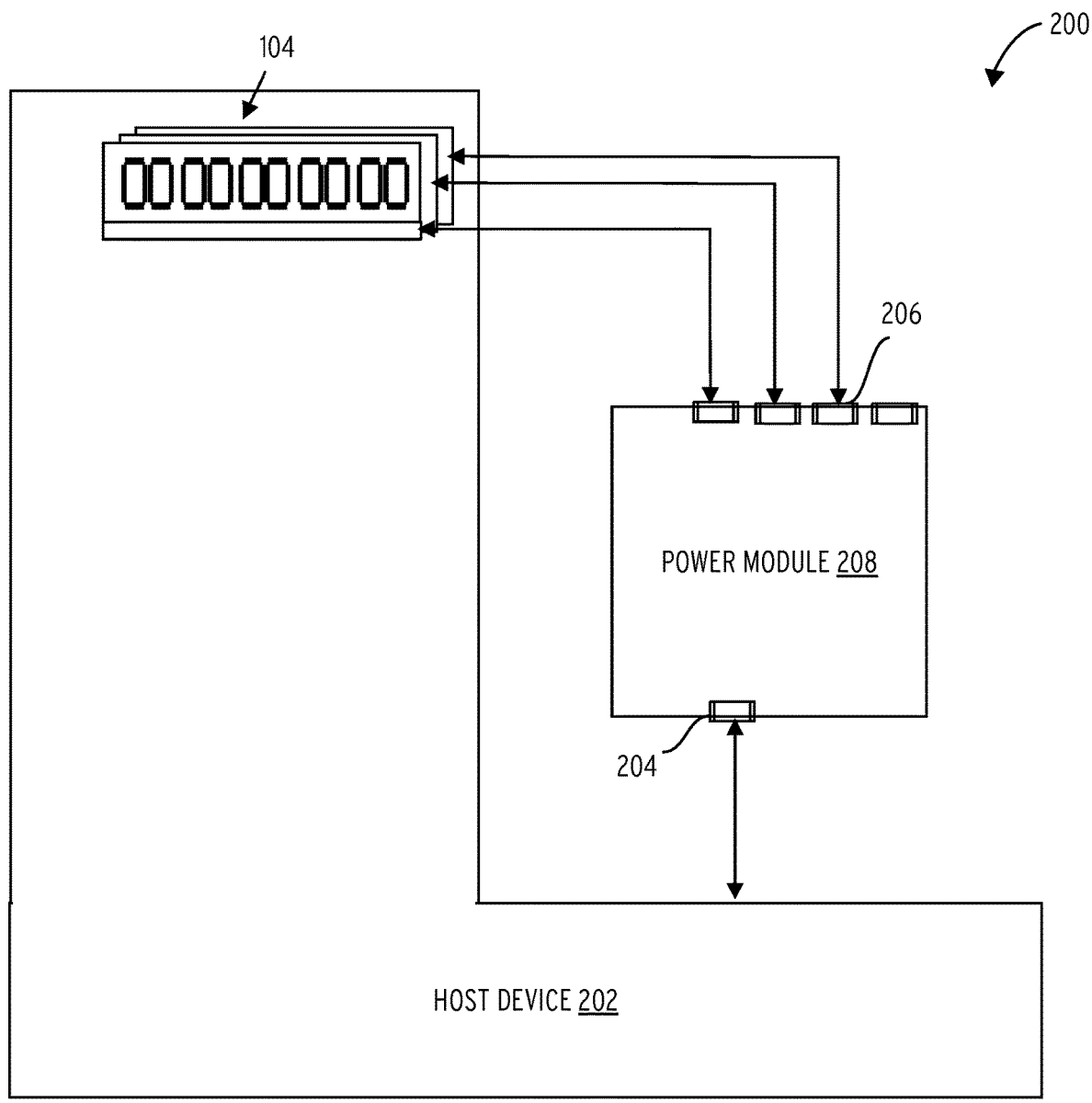
FIG. 2 illustrates a memory system 200 in accordance with one embodiment.
Figure 3:
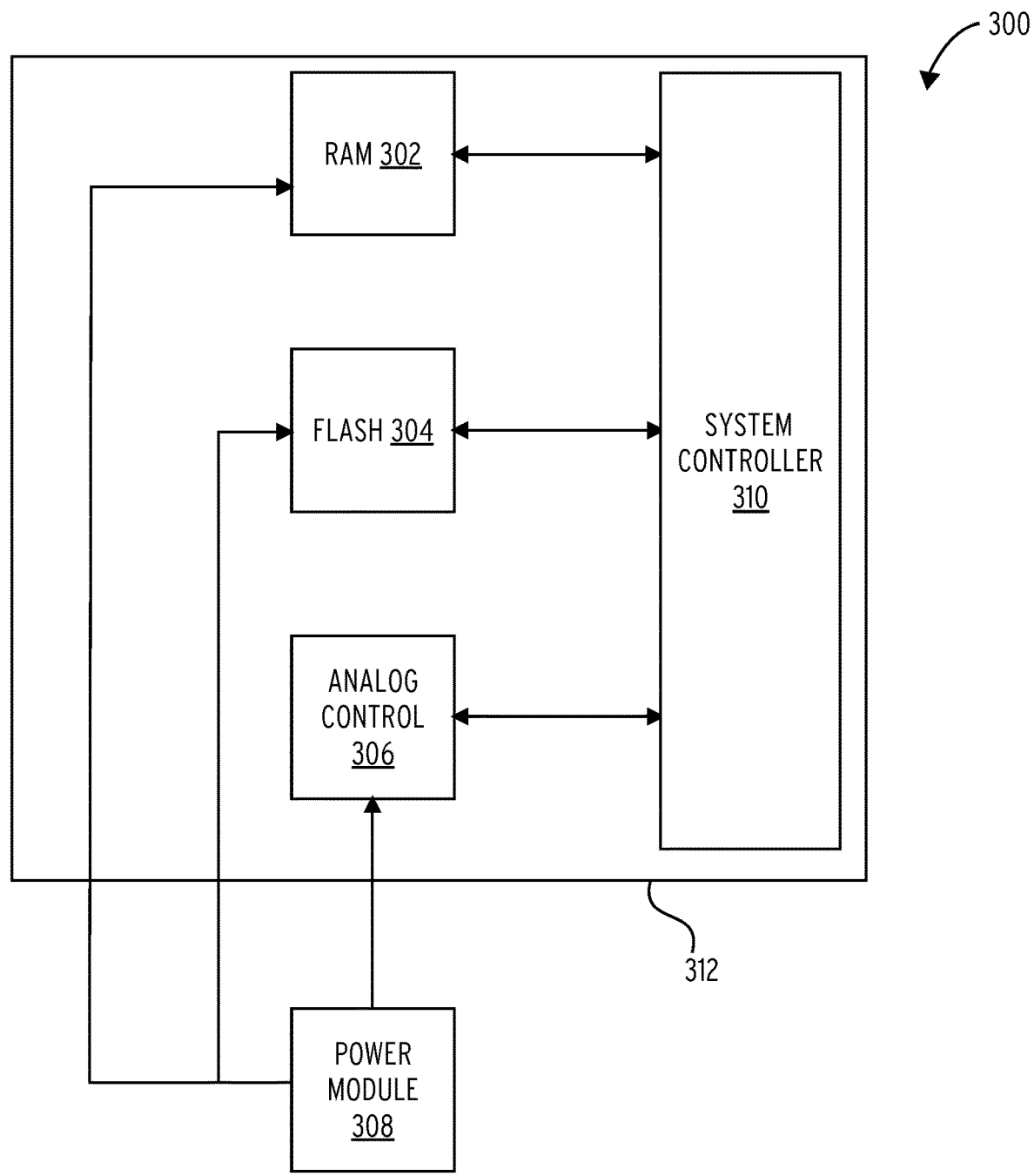
FIG. 3 illustrates a machine memory system 300 in accordance with one embodiment.

Referring to FIG. 3, a machine memory system 300 provides a low-cost, high density, non-volatile memory by using a low-cost RAM 302 (any volatile memory) in conjunction with a low-cost FLASH 304 (any non-volatile memory).

The machine memory system 300 includes, but may not be limited to, the RAM 302, the FLASH 304, analog control 306, power module 308, and a system controller 310. Other elements and/or couplings among the elements may be apparent to skilled practitioners in the relevant art(s). The power module 308 may include batteries and/or one or more power capacitors.

The RAM 302 may comprise an SDRAM (Synchronous Dynamic Random Access Memory). Other types of volatile random access memory may also be used. The nonvolatile memory may comprise a NAND FLASH, and again, other types of nonvolatile memory may be used.

The analog control 306 interfaces the machine memory system 300 to an external energy source, for example the power source of a larger system (a "host" system) that incorporates and uses the machine memory system 300 in modular form. For example, the external power source may be the power of a personal or business computer system that incorporates the machine memory system 300.

The analog control 306 also interfaces the machine memory system 300 to a backup power source, the power module 308. The power module 308 may include one or more power capacitors and/or one or more batteries. The power module 308 provides power to the machine memory system 300 for a temporary time when external power fails. The power module 308 may provide power for long enough to copy data blocks from the RAM 302 to the FLASH 304.

In the event of an external power failure, the machine memory system 300 may operate as an isolated subsystem of the host device. The analog control 306 may recognize that external system power has failed. The system controller 310 may then initiate backup of data currently stored in the RAM 302 into the FLASH 304. Herein, the term "backup" means that data of the RAM 302 is stored into the FLASH 304. Upon restoration of host device power, the system controller 310 may initiate restoration of backed-up data from FLASH 304 to the RAM 302. Herein, the term "restore" and "restoration" means that data of the FLASH 304 is stored into the RAM 302.

The system controller 310 may thus include logic to backup data from RAM 302 to FLASH 304 when the host device power fails, and to restore data from FLASH 304 to RAM 302 when the host device power becomes available again. Note this does not mean that the machine memory system 300 necessarily operates on host device power when available. In some implementations, the machine memory system 300 may always operate on power supplied by the power module 308, with the power module 308 being replenished from the host device power while the host device power is operable.

Those skilled in the art will appreciate that various functional components, such as the analog control 306 and the system controller 310, and even the RAM 302 and FLASH 304, may in fact be implemented together as one or more integrated circuit devices (e.g., a System on a Chip), or packaged as one or more discrete physical components.

Data stored within the machine memory system 300 persists even when the power of the host device fails. The host device may interact with the machine memory system 300 as though interacting with RAM 302 (and, in some cases, the host device may "see" the RAM 302 as a different type of volatile memory technology than the RAM 302 actually is), even though, transparently, the data is stored internally by the machine memory system 300 in FLASH 304 persistently in the absence of host device power.

The machine memory system 300 may write data to FLASH 304 only in the event that host device power fails. Thus, the FLASH 304 undergoes many fewer write cycles than would occur if it were being written every time data were written to the machine memory system 300 from the host device. When the FLASH 304 is a low-cost, limited duty cycle NAND FLASH, the result in an extension of the useful lifetime of the FLASH 304.

The system controller 310 provides a memory interface to the host device. The memory interface may comprise a standard data and control interface for some particular kind of volatile memory. For example, the system controller 310 may provide an SDRAM data, address, and control interface to the external system, even when the RAM 302 is not an SDRAM. The interface provided to the host device may or may not be the interface for the type of volatile memory actually used by the host device.

The system controller 310 may additionally provide an interface whereby the host device may send commands to the machine memory system 300 to control the machine memory system 300 or obtain status. For example, in some embodiments the host device may command the machine memory system 300 to initiate a backup of data from RAM 302 to FLASH 304, even though the host device power is still available. Additionally or alternatively, the machine memory system 300 or host device may provide a direct user interface, such as a switch or control on a graphic user interface, whereby a user of the host device may directly initiate a copy of data from RAM 302 to the FLASH 304.

Another action which may in some embodiments be initiated on the machine memory system 300 is restoring data from FLASH 304 to the RAM 302. In some embodiments the host device may operate its system interface to the machine memory system 300 to initiate a self test of the machine memory system 300.

As previously described, the system controller 310 may comprise logic to interface the RAM 302 to the host device, such as a personal computer system or a business computer system. Other examples of applications of the machine memory system 300 are embedded control applications, communications, and consumer products.

The system controller 310 may present an interface to the host device, so that the RAM 302 is addressable for reading and writing of data by the host device.

Logic of the analog control 306 may detect when power from the host device fails. For example, the host device may suffer a power source outage or battery failure. When host device power fails, the analog control 306 may provide backup power to the RAM 302, FLASH 304, and to the system controller 310 for long enough to enable the backup of data from the RAM 302 to the FLASH 304. The power module 308 may act as the source of this backup power and as a conduit of power from the host device when the host device power is "on".

In some embodiments, the system controller 310 may include logic to enable the host device to initiate a backup of data from the RAM 302 to the FLASH 304, instead of waiting for a power failure to initiate the backup. The system controller 310 may also comprise logic to emulate to the host device a type of volatile memory other than the actual type of the volatile memory. For example, internally the machine memory system 300 may employ SDRAM for the RAM 302. However, the system controller 310 may include logic to emulate single data rate RAM (SDRAM), double data rate RAM (DDRAM), DDR2, asynchronous SRAM, C-F card, or PCI-Express (among other examples) to the host device.

Some or all of the components of the machine memory system 300 may implemented in various ways. For example, these components may be implemented as one of a multi-chip set, a board subsystem, or even a single chip.

Backups and restores of data may be implemented as data moves from the RAM 302 to the FLASH 304, and vice versa, via the system controller 310. In other embodiments, backups and restores may be implemented via data moves from the volatile RAM 302 to the FLASH 304 directly, without passing through the system controller 310 and with the system controller 310 operating as a coordinating controller of the data backup or restore.

Figure 4:
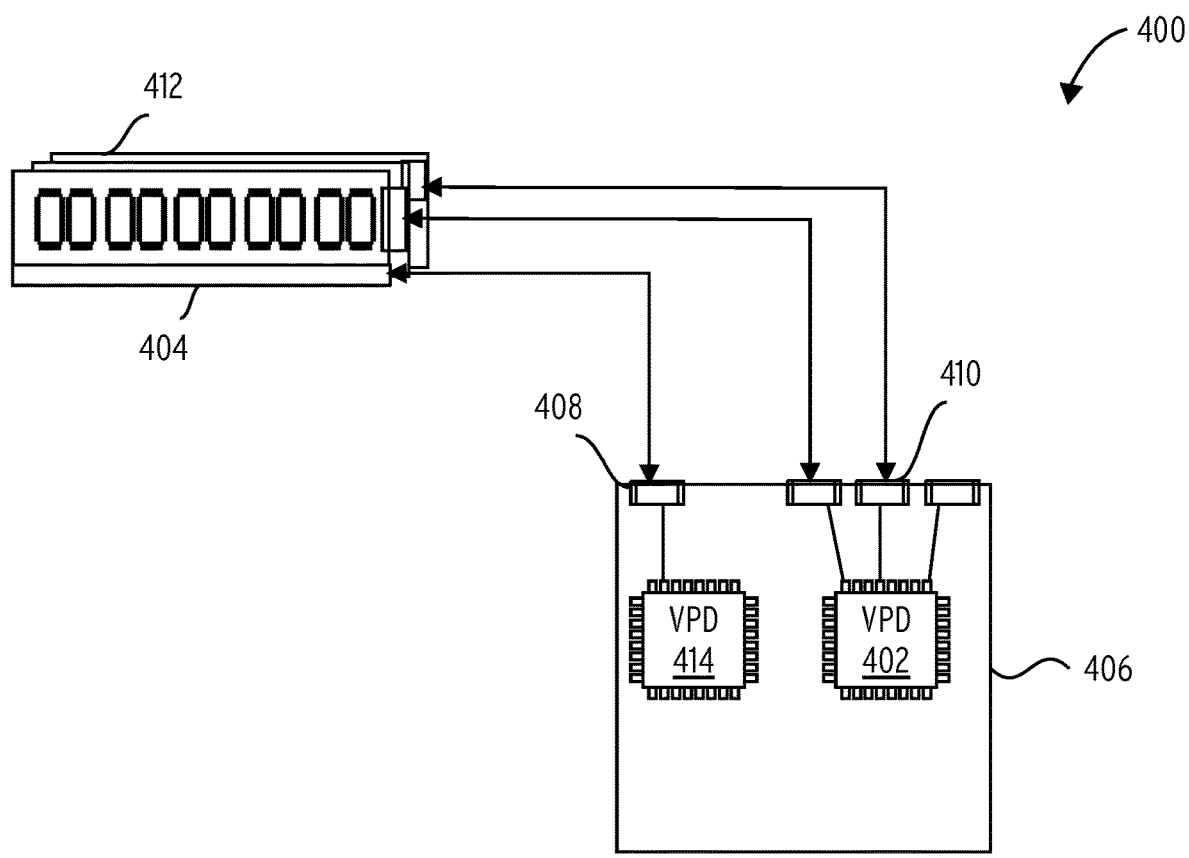
FIG. 4 illustrates a memory system 400 in accordance with one embodiment.

Referring to FIG. 4, the management NVDIMM 404 is coupled to the management port 408 on the power module 406. Management NVDIMM 404 reads the vital product data EEPROM (VPD 402) of the power module 406 through a serial interface (see FIG. 6) of the management port 408, and configures itself as though coupled to the power module 406 in a one-to-one configuration. The management NVDIMM 404 will then respond to all required register access and optional register access commands from the host device that relate to the power module 406.

The following are examples of optional register access commands:
 1. Instruct the power module 406 to perform a measurement of the capacitance of its internal power capacitors.
 2. Request the total charge stored by the power module 406 (capacitance of the internal capacitors multiplied by voltage stored on the internal capacitors).

The following are examples of required register access commands:

3. Report to host whether an NVDIMM is non-volatile or not, meaning whether there is enough energy available from the power module 406 to back up the volatile memory of the NVDIMM to the non-volatile memory of the NNVDIMM.

NVDIMMs that are attached to the non-management ports, such as non-management NVDIMM 412 coupled to non-management port 410, read the VPD 402 and configure themselves as though they are coupled in a one-to-one configuration to a non-management port on a dedicated power module. Each non-management NVDIMM 412 responds only to required register access commands from the host device. The management port 408 may be coupled to a VPD 414 different than the VPD 402 for the non-management ports.

The power module 406 indicates that it has a good status (sufficient power to operate a backup by the attached NVDIMMs) by driving an event pin 606 (see FIG. 6) of an NVDIMM port. Each NVDIMM (management or non-management) monitors the event pin 606 of its respective power port for an indication of sufficient power available in the power module 406 to perform a memory backup operation by the NVDIMM if needed. If the event pin 606 indicates insufficient power, the NVDIMM generates an interrupt to the host device indicating there is insufficient power for a memory backup operation by the NVDIMM, and thus the NVDIMM is "non-volatile". The interrupt identifies the NVDIMM as no longer being a non-volatile memory resource.

Each non-management NVDIMM 412 responds to all required register accesses by the host device that relate to the power module 406.

Alternatively to the VPD-based method of identifying which NVDIMM is the master NVDIMM responsible for managing the power module 406 as described above, other methods of identification are possible and include having a specific signal or pin provided by the power module 406 to identify the master or non-management ports.

The power module 406 may not enable the management NVDIMM 404 to communicate with or detect the presence of the at least one non-management NVDIMM 412. The memory system 400 thus implements an unconventional distribution of device co-awareness and control among the management NVDIMM 404, non-management NVDIMM 412, host device, and power module 406. Each non-management NVDIMM 412 operates autonomously from the management NVDIMM 404 and from one another, with no capability to manage the power module 406, and the host device does not manage the power module 406, but instead interacts with the management NVDIMM 404 for status information about the power module 406. The management NVDIMM 404 does not manage or communicate with the non-management NVDIMM 412. The host device obtains status of the non-management NVDIMM 412 via the required register access.

Thus, a power module for a computer system may include an internal source of stored energy and a group of interface ports, including a management port and non-management ports. The management port provides a control interface to control the power module. The non-management ports each lack the control interface of the management port, and each provide a signal indicating that the power module has a sufficient amount of the stored energy to power a defined operation by external devices coupled to and drawing power from said non-management ports. The management port will typically provide a similar signal to the coupled management device. The signal may be implemented as a high or low voltage level on a serial interface cable pin.

Figure 5:
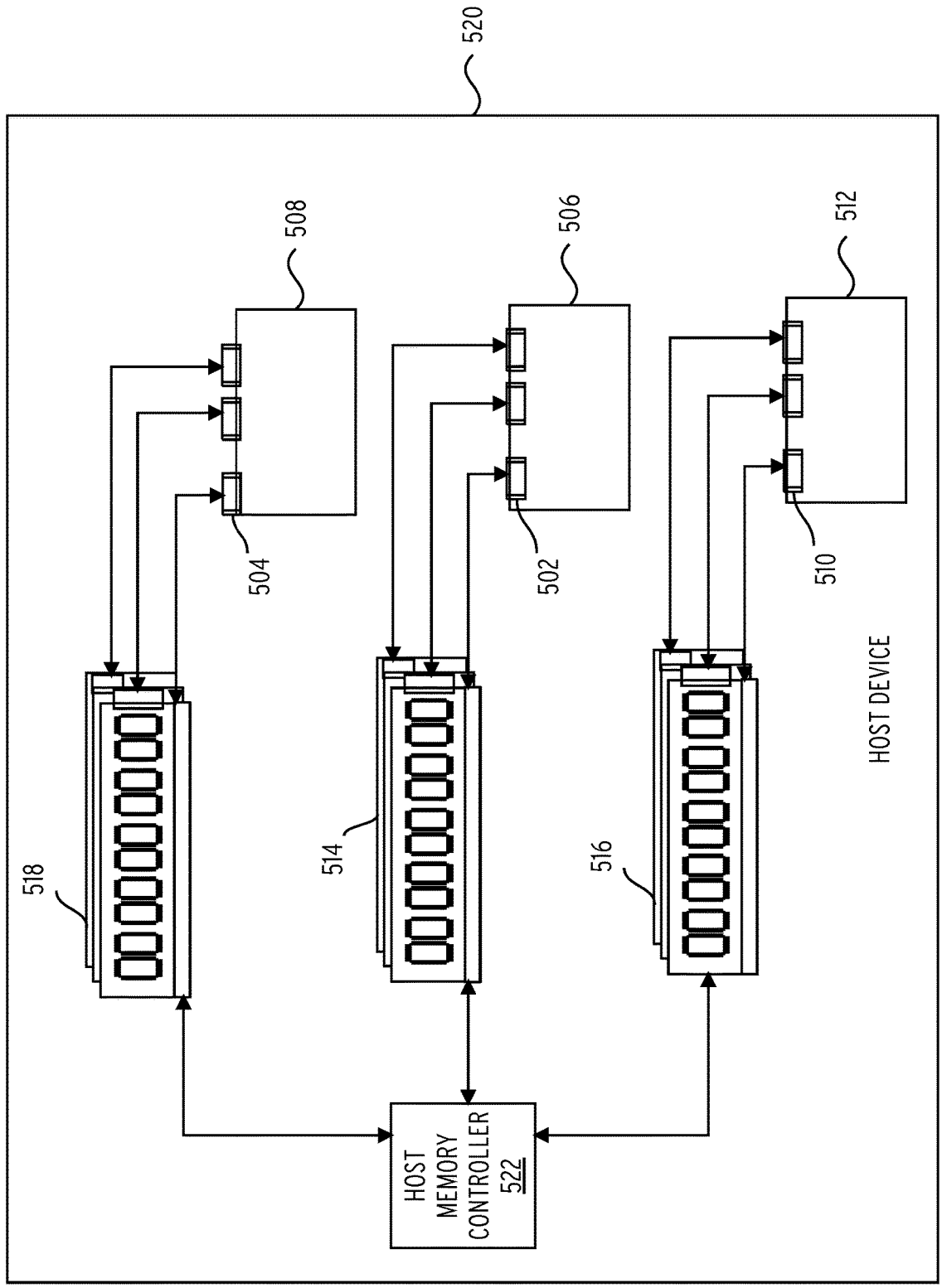
FIG. 5 illustrates a host device 520 utilizing multiple power modules in accordance with one embodiment.

Referring to FIG. 5, a host device 520 includes multiple power modules (power module 506, power module 508, and power module 512), each dedicated to one or more NVDIMM modules (NVDIMMs 514, NVDIMMs 516, and NVDIMMs 518). Each of the power modules includes a management port dedicated to one of the NVDIMMs that the power module is dedicated to (management port 502, management port 504, and management port 510). A processor or controller of the host device 520 (in this example, a host memory controller 522) interacts directly with the NVDIMM modules.

Each of the distinct power module/NVDIMM assemblies may operate as described in conjunction with the memory system 400 in FIG. 4.

Figure 6:
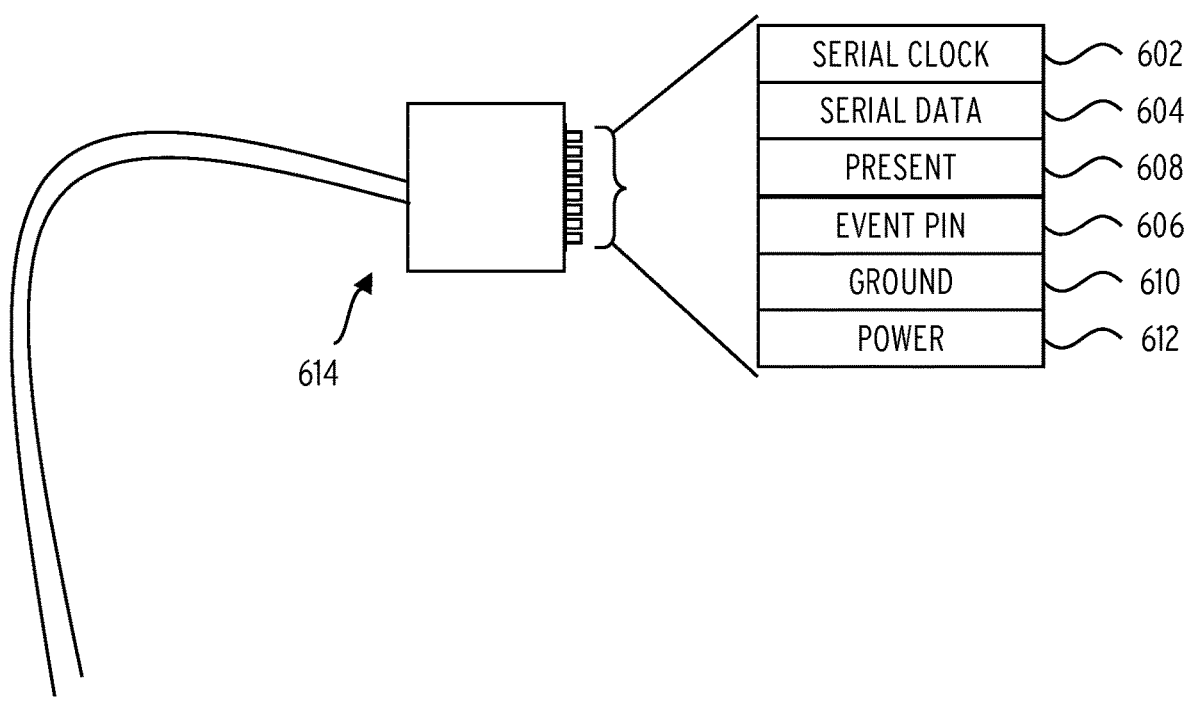
FIG. 6 illustrates a serial interface in accordance with one embodiment.

Referring to FIG. 6, a serial interface cable 614 includes pins for a serial clock 602, serial data 604, an event pin 606, a present 608, a ground 610, and power 612. The serial interface cable 614 may be used with both a management port or a non-management port.

The serial clock 602 provides timing for serial communication over the serial data 604 pin between an NVDIMM and the power module. The present 608 pin indicates a working cable connection to the port. The event pin 606 operates as described in conjunction with the memory system 400 of FIG. 4. Power is provided from the power module to the coupled NVDIMM via the power 612 pin. The ground 610 pin provides a common ground reference for the coupled NVDIMM and the power module.

Figure 7:
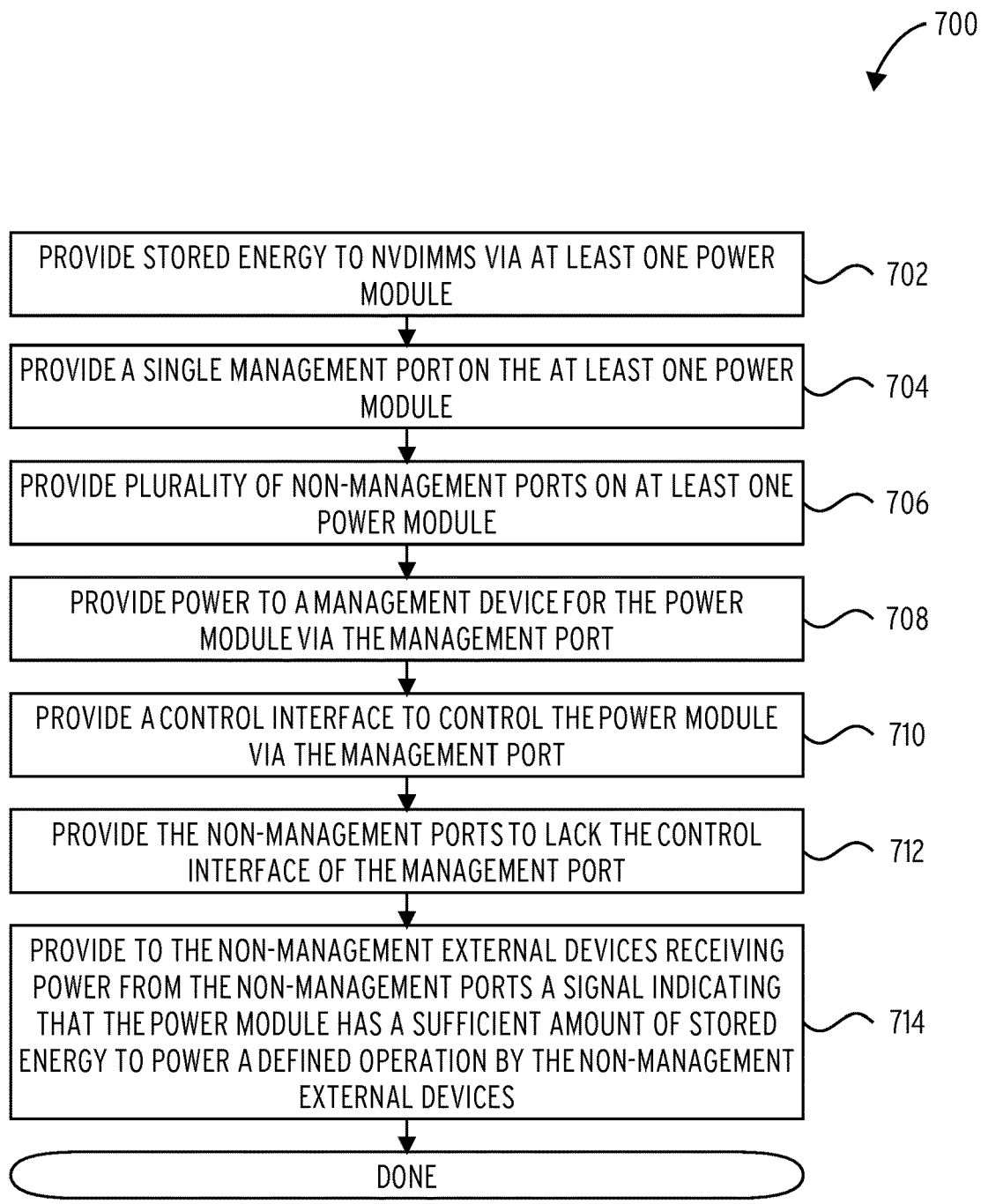
FIG. 7 illustrates a technique 700 for providing power to NVDIMM modules in a computer system in accordance with one embodiment.

Referring to FIG. 7, a technique 700 to provide power to NVDIMM modules in a computer system may be carried out as follows:

provide stored energy to NVDIMMs via at least one power module 702;
provide a single management port on the at least one power module 704;
provide plurality of non-management ports on at least one power module 706;
provide power to a management device for the power module via the management port 708;
provide a control interface to control the power module via the management port 710;
provide the non-management ports to lack the control interface of the management port 712; and
provide to the non-management external devices receiving power from the non-management ports a signal indicating that the power module has a sufficient amount of stored energy to power a defined operation by the non-management external devices 714.

What is claimed is:
1. A power module for a computer system, comprising:
an internal source of stored energy;
a plurality of interface ports, comprising:
  a single management port to connect to a management device; and
  a plurality of non-management ports to connect to non-management external devices through interface cables that include respective event pins, wherein the non-management external devices are external to the power module;
wherein the management port is to provide to the management device, which is to receive power from the power module via the management port, a control interface to control the power module; and wherein each of the non-management ports lacks the control interface of the management port, wherein the non-management external devices receive power from the non-management ports, and the non-management ports are to provide to the non-management external devices through the respective event pins signals indicating that the power module has a sufficient amount of the stored energy to power a defined operation by the non-management external devices, and wherein the non-management external devices are coupled directly to a host controller external to the power module, and are operable to generate an interrupt to the host controller indicating there is insufficient stored energy to power the defined operation without passing through the power module, wherein each non-management external device operates autonomously from the management device and from one another, and wherein the host controller is further coupled to the management device and does not control the power module through the management device, but instead receives status information about the power module from the management device.

2. The power module of claim 1, wherein:
the plurality of interface ports are serial interface ports.

3. The power module of claim 1, wherein:
the signals provided by the non-management ports are to indicate if there is a sufficient amount of the stored energy to power a memory backup operation by the non-management external devices.

4. The power module of claim 3, wherein the signals are high or low voltage levels and the interface cables are serial interface cables.

5. The power module of claim 1, wherein each of the non-management external devices is to be coupled to only one of the non-management ports.

6. The power module of claim 1, wherein the control interface is to receive a control command to the power module to measure and report the stored energy via the management port.

7. A method for providing power to non-volatile dual in-line memory modules (NVDIMMs) in a computer system, the method comprising:
providing stored energy to the NVDIMMs via at least one power module with stored energy therein;
providing a single management port on the at least one power module;
providing a plurality of non-management ports on the at least one power module;
providing power to a management device via the management port;
providing a control interface to control the power module via the management port;
providing power to a plurality of non-management external devices via the plurality of non-management ports; and
providing to non-management external devices, through interface cables that include respective event pins, signals indicating that the power module has a sufficient amount of the stored energy to power a defined operation by the non-management external devices,
wherein the non-management external devices are operable to generate an interrupt to a host controller indicating there is insufficient stored energy to power the defined operation without passing the interrupt through the power module, wherein each non-management device operates autonomously from the management device and from one another, and wherein the host controller is further coupled to the management device and does not control the power module through the management device, but instead receives status information about the power module from the management device.

8. The method of claim 7, wherein:
the plurality of non-management ports and the management port are serial interface ports.

9. The method of claim 7, wherein the defined operation comprises a memory backup operation.

10. The method of claim 9, wherein the signals are high or low voltage levels and the interface cables are serial interface cables.

11. The method of claim 7, wherein each of the non-management external devices is coupled to only one of the non-management ports.

12. The method of claim 7, further comprising receiving, by the control interface, a control command to the power module to measure and report the stored energy via the management port.

13. A system comprising:
a power module including an internal source of stored energy, a management port with a control interface to control the power module, and a plurality of non-management ports lacking the control interface of the management port;
a management device external to the power module and coupled to the management port to receive power therefrom;
a plurality of non-management devices external to the power module, each coupled to one of the plurality of non-management ports to receive power therefrom; and
a host controller external to the power module and coupled to each of the plurality of non-management devices,
wherein each of the plurality of non-management devices is operable to receive a signal from one of the plurality of non-management ports indicating sufficiency of energy stored in the power module, and to generate an interrupt to the host controller indicating there is insufficient stored energy to power a defined operation by the non-management device, without passing the interrupt through the power module, wherein each non-management device operates autonomously from the management device and from one another, and wherein the host controller is further coupled to the management device and does not control the power module through the management device, but instead receives status information about the power module from the management device.

14. The system of claim 13, wherein the plurality of non-management devices comprise non-volatile dual in-line memory modules (NVDIMMs).

15. The system of claim 14, wherein the management device comprises a NVDIMM.

16. The system of claim 13, wherein each of the plurality of non-management devices are coupled to one of the plurality of non-management ports through a number of serial interface cables.

17. The system of claim 16, wherein each of the plurality of non-management devices receive the signal indicating sufficiency of energy stored in the power module through an event pin in the serial interface cable through which the non-management device is coupled to one of the plurality of non-management ports.

18. The system of claim 17, wherein the signal comprises a high or low voltage level on the event pin.

\* \* \* \* \*